UNITED STATES PATENT OFFICE.

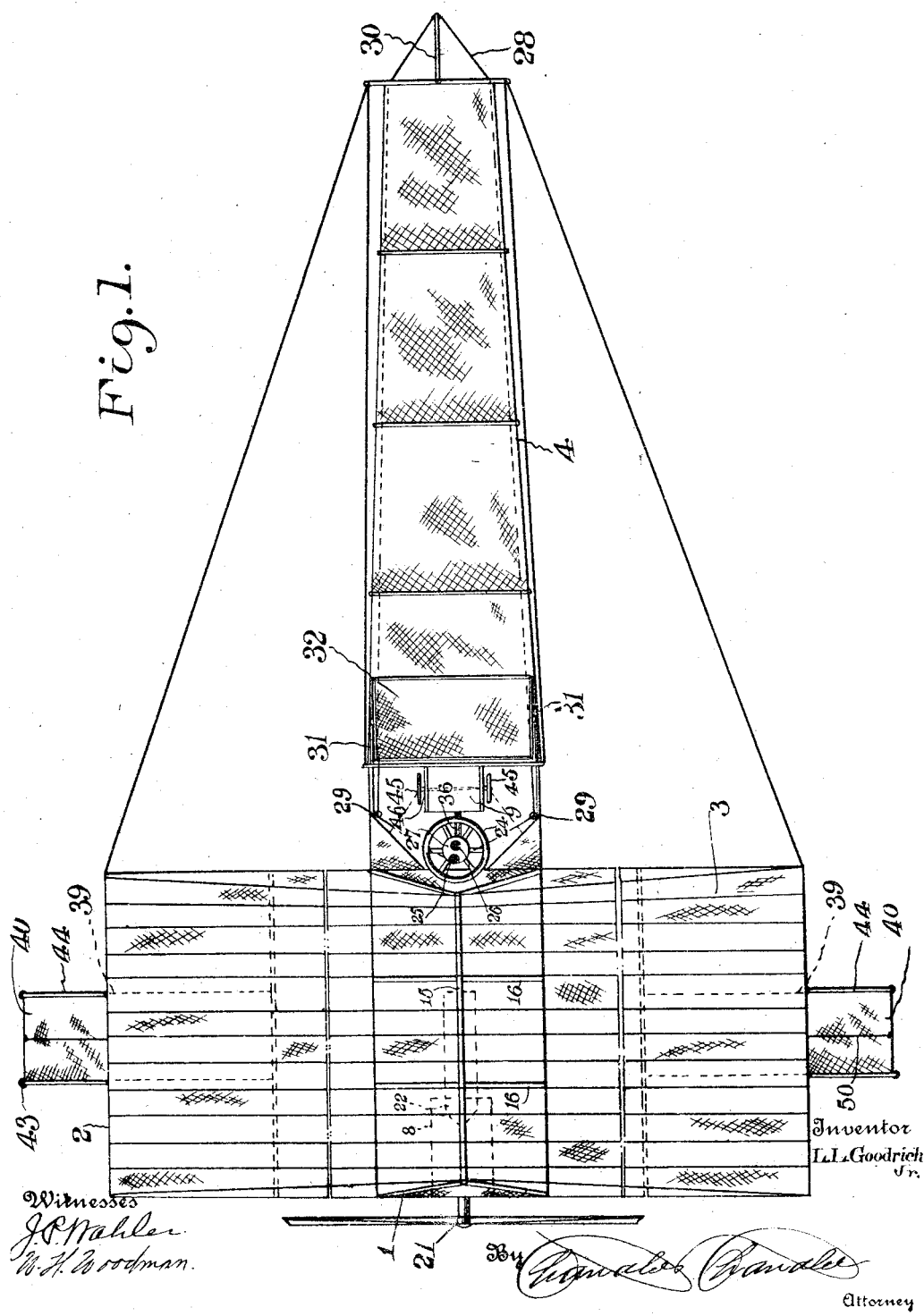

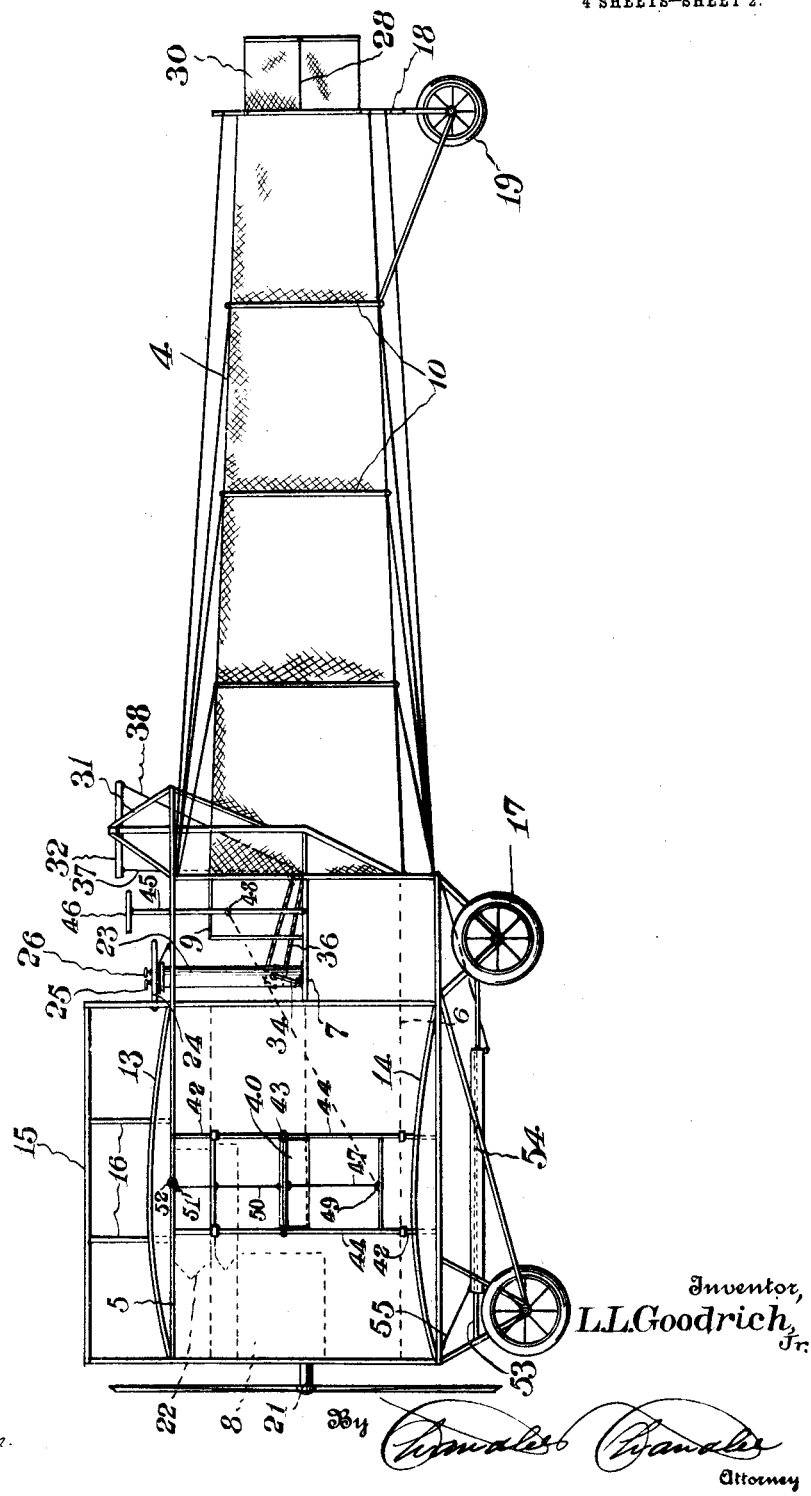

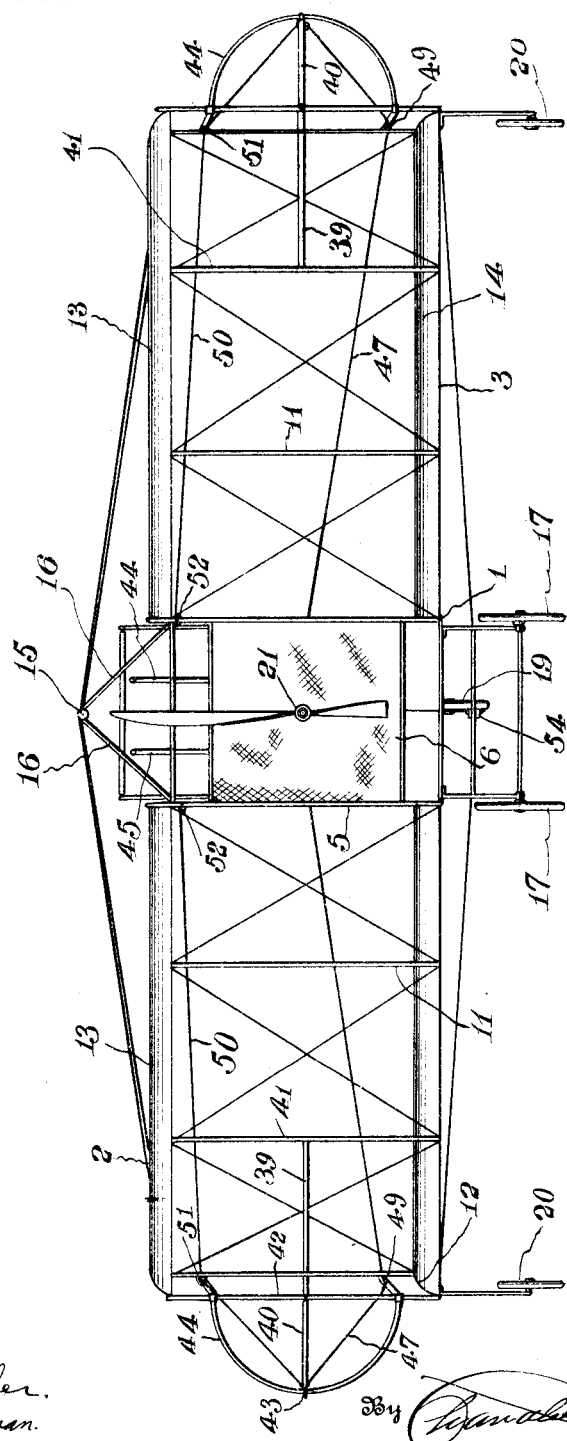

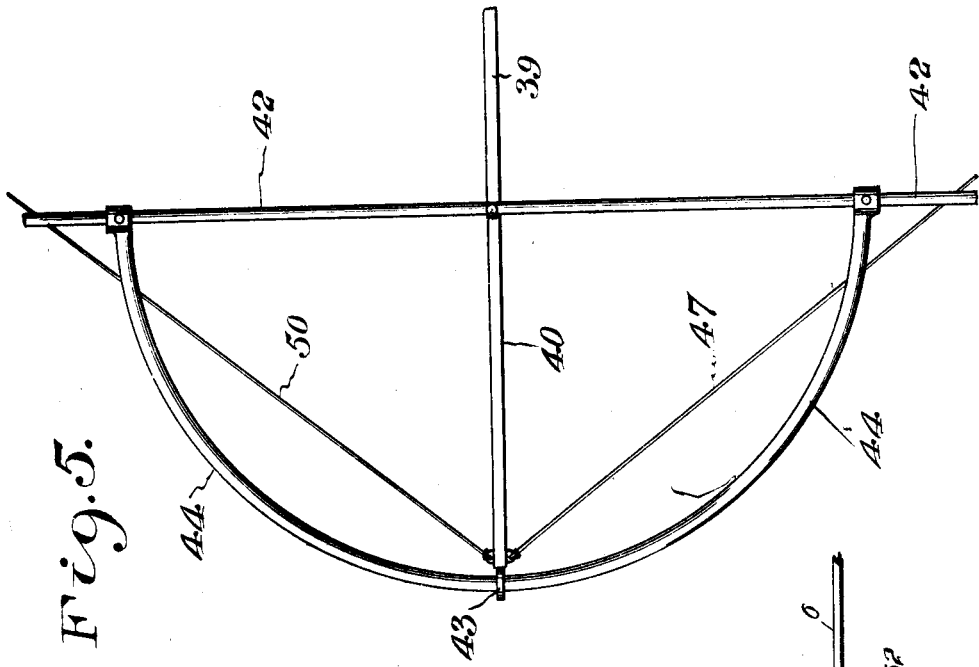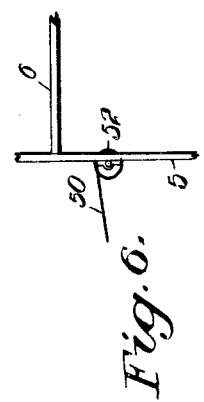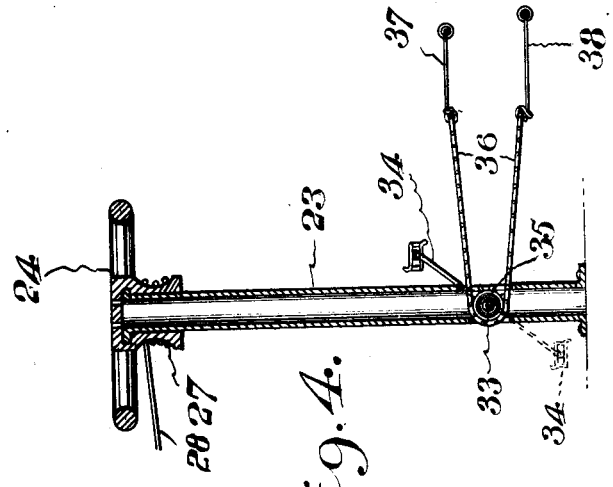

LUMAN L. GOODRICH, JR., OF SAN ANTONIO, TEXAS.

AEROPLANE.

1,052,580. Specification of Letters Patent. Patented Feb. 11, 1913.

Application filed September 19, 1911. Serial No. 650,188.

*To all whom it may concern:*

Be it known that I, LUMAN L. GOODRICH, Jr., a citizen of the United States, residing at San Antonio, in the county of Bexar, State of Texas, have invented certain new and useful Improvements in Aeroplanes; and I do hereby declare the following to be a full, clear, and exact description of the invention, such as will enable others skilled in the art to which it appertains to make and use the same.

My invention relates to new and useful improvements in aeroplanes, and the object of my invention is to improve the construction and increase the efficiency of the same.

A further object of my invention is the provision of an aeroplane having a rectangular body member and a rectangular tapering tail member in alinement therewith, both of said members being covered to form a longitudinally extending tubular member through which the air passes when the aeroplane is in motion.

A further object of my invention is the provision of an aeroplane having an ascending and descending plane and novel means for tilting said plane.

A further object of my invention is to provide a novel and effective means for maintaining transverse stability said means consisting of ailerons, each of the wings of the aeroplane having a fixed aileron positioned between its upper and lower planes and adjacent the end of the wing and a movable aileron carried by the end of each wing.

And a still further object of my invention is to provide a novel control mechanism for tilting said movable ailerons.

With these and other objects in view, my invention will be more fully described, illustrated in the accompanying drawings which show a preferred embodiment of my aeroplane and then specifically pointed out in the claims which are attached to and form a part of this application.

In the accompanying drawings, Figure 1 is a top plan view of the aeroplane. Fig. 2 is a side elevation thereof. Fig. 3 is a front elevation. Fig. 4 is a detail sectional view of the steering post showing the operating mechanism for the ascending and descending plane. Fig. 5 is a detail front elevation of one of the ailerons showing the manner in which it is mounted upon the wing. Fig. 6 is a detail view of the automatic reel.

Referring more specifically to the drawings, in which similar reference numerals designate corresponding parts throughout, my invention will be seen to consist primarily of a body member, laterally directed wing members and a rearwardly extending tail member, these members being designated as a whole by the numerals 1, 2, 3 and 4 respectively.

The body member consists of a substantially rectangular shaped frame 5 which forms the outer frame of the body and a second rectangular inner frame member 6 equal in width to the outer frame member but with its upper and lower sides spaced from the corresponding sides of the outer frame member. This latter frame member 6 is divided by a central, longitudinally extending floor or platform 7 and upon the forward end of which is mounted a motor shown conventionally at 8 while upon the rear end is mounted the driver's seat 9. Extending rearwardly from this inner frame member and forming a continuation thereof is the frame 10 of the tail member 4 and as shown this frame is rectangular in section and tapers gradually from its forward to its rear end. The inner frame member 6 together with the frame 10 of the tail member is covered throughout its length with fabric, preferably vulcanized fabric or varnished silk in order to render it impervious to passage of air and as shown, these two members when so covered form a longitudinally extending tube through which the air will pass when the aeroplane is in motion.

Extending laterally one upon either side, from the forward end of the body member, are the wing members which as a whole have been designated by the numerals 2 and 3. Each of these winged members consists of a rectangular frame 11 having parallel front and rear faces and parallel top and bottom faces, said latter faces being pitched or curved as shown at 12 and covered with fabric to form upper and lower planes 13 and 14 respectively.

The frame members above described are preferably formed of strips of wood as light as possible consistent with the strains which they must undergo and these strips are suitably braced and guyed by means of wires or cord. I do not however wish to limit myself in any way to the specific material employed in the construction of the frame or to the specific manner of forming the same, as my invention relates entirely to the arrangement of parts and the means for adjusting the various planes which will be hereinafter described. For the sake of clearness however I have illustrated the aeroplane with its wings and tail braced by means of wires which are secured to a longitudinally extending bar 15 which is supported above the outer frame member 5 of the body and centrally thereof by means of the braces 16. The wings and tail are also braced by wires connecting the same with the lower portion of the frame 5.

As a means for supporting the aeroplane when upon the ground I have provided it with a plurality of wheels 17 which are positioned one under each corner of the body member 1, said wheels being journaled upon suitable spindles carried by the body member. I have also provided the rear end of the tail member 4 with a downwardly extending hanger 18 which carries a bearing wheel 19 and each wing is provided at its outer end, in like manner, with a wheel 20 which wheels, serve to prevent the machine from tilting sidewise when at rest upon the ground. As shown these wheels are preferably so positioned that when at rest the machine is slightly inclined from its forward to its rear end, this inclination serving to cause the machine when started, to leave the ground much quicker than it otherwise would.

As shown the shaft of the motor extends forwardly of the body member and the propeller is secured directly upon the extended end of the shaft as shown at 21. The motor is positioned in the forward end of the covered frame of the body member and is thus exposed to the air passing through the same by which means it is maintained in a properly cooled condition and the gasolene and the oil tanks are preferably located outside of this inner frame member and above the same, their position being conventionally shown at 22.

As best shown in Fig. 1 of the drawings that portion of the upper face of the inner frame member 6 adjacent the driver's seat is left uncovered to admit of the driver taking his position to operate the machine and extending upwardly from the frame 7 which forms the floor and in front of the driver's seat is a hollow steering post 23 and rotatable upon the upper end of this post is a steering wheel 24 provided with the spark and throttle control levers 25 and 26 which are operatively connected to the motor in the customary manner. This steering wheel is provided with a downwardly extending sleeve 27 which is grooved to form a pulley and secured to this pulley and the forward ends of the wires 28, which wires are run forwardly a slight distance to the opposite side of the body 1 and are then passed through suitable rings 29 carried by the sides of the frame and are fastened by their other ends to the opposite sides of the rear end of a vertical plane 30 which is swingingly mounted upon the rear end of the tail member 4 and which forms the rudder of the aeroplane. As shown this plane 30 is mounted to extend rearwardly from the rear of the tail and in a central position and is so mounted that it may be readily swung to the right or left to steer the machine, the steering wheel together with the wires 28 furnishing a simple and ready means by which the operator may actuate the same.

As shown the top of the frame 5 of the body member is extended rearwardly and extending upwardly from this portion of the frame which is suitably braced to the main body of the aeroplane are the frame members 31 between the upper ends of which is swingingly mounted a plane 32 which in normal position is parallel to the top of the body member and which is the ascending and descending plane. As will be readily seen the tilting upward of the forward end of this plane will cause the aeroplane to rise when in motion, while the tilting downwardly thereof will cause the machine to descend. Journaled in opposite sides of the lower portion of the steering post is a transversely extending shaft 33 the ends of which project beyond the post and are provided with oppositely directed foot pedals 34 by means of which the shaft may be rotated. Keyed upon this shaft and within the steering post is a sprocket wheel 35 and coacting with this wheel is a sprocket chain 36 the ends of which extend rearwardly through a suitable slot formed in the post and are connected to wires 37 and 38 the other ends of which pass rearwardly below suitable pulleys or rings and are then extended upwardly and connected to the forward and rearward edges respectively of the plane 32. As will be readily understood from the above description the ascending and descending plane may be readily tilted by the operator by means of these pedals thus leaving his hands free to steer.

As a means for maintaining transverse stability I have provided each of the wings of the aeroplane with a fixed aileron 39 and a movable aileron 40. As shown the fixed or stationary ailerons are somewhat larger than the movable ones and they are positioned in the ends of the wings intermediate between the upper and lower planes thereof and parallel thereto, being supported in place at their inner ends by the vertical spaced apart braces 41 and at their outer ends by similar braces 42, these braces being so positioned that the ailerons are positioned centrally in the ends of the wings. The movable ailerons are equal in width to the stationary ailerons and are secured by their inner edges to the braces 42 in such a manner as to normally extend beyond the ends of the wings in the same plane with the fixed ailerons. These movable ailerons are hingedly connected by their inner ends to the outer ends of the fixed ailerons and the braces 42 to adapt them for up and down swinging motion and as a means for bracing them and supporting them in whatever position they may be tilted I have provided the outer ends of each of the ailerons with outwardly extending rings 43 which are slidably mounted over rods 44 which are curved about the pivotal line of the ailerons as a center and which have their ends firmly secured to the braces 42, these curved rods forming guides or supports for the outer ends of the movable ailerons.

Pivoted by their lower ends to swing outwardly and extending upwardly one upon each side of the operator's seat are the lever arms 45 each of which terminates at its upper end in a transverse member 46, said transverse members being so positioned that the operator when in his seat, may readily swing either of the levers outwardly by pressing against it with his arm or body while his hands are still on the steering wheel. Secured to these lever arms intermediate their length are wires or cords 47 which cross each other beneath the operator's seat and which are then extended forwardly through suitable rings or pulleys 48 and outwardly through the wings and down over rings 49 carried by the end members of the frames of the wings and have their free ends attached to the central portion of the outer ends of the movable ailerons. By this means the operator may readily tilt either of the movable ailerons downwardly if necessary to assist in balancing the machine. As a means for automatically returning these movable ailerons to normal position I have attached wires 50 to the central portion of their outer ends and these wires are extended upwardly over rings 51 and inwardly through the wings to the main frame of the body at which point their free ends are attached to automatic reels 52 the strength of which is sufficient to draw the ailerons back to position. If desired weights may be substituted for these reels but for the sake of lightness, which of course is a primary consideration in machines of this character, I prefer to employ the former.

Positioned centrally and below the body member and extending longitudinally thereof is a rod 53 upon which is slidably mounted a weight 54 and it will be seen that by moving this weight along the rod it will serve to level the machine. As a means for so moving this weight I have provided a wire 55 one end of which is secured to the forward end of the weight and this wire extends forward to the front end of the body member and then upwardly over suitable rings or pulleys and rearwardly past and within reach of the driver's seat, then downwardly through suitable rings to the rear end of the body 1 and then forwardly to the rear end of the weight to which it is secured. As will be readily seen, the operator by grasping that portion of this wire adjacent the seat can readily move the weight either forward or rearwardly and thus balance the machine.

The operation of my aeroplane is identical with that now in use with the exception of the control mechanisms which latter have been described in detail and their operation explained as each was taken up and therefore a further description of the operation is not deemed necessary.

From the foregoing description taken in connection with the drawings it will be apparent that I have provided a simply constructed and readily operated aeroplane and one which because of the longitudinally extending tubular member formed by the body and tail possesses unusual buoyancy. It will also be evident that I have provided a novel means for tilting the movable planes, namely the rudder the ascending and descending planes, and the movable ailerons. I do not however wish to limit myself in any way to the specific structure shown and it will be understood that minor changes in details of construction may be made if desired without in the slightest degree departing from the spirit of my invention.

What I claim is:—

1. An aeroplane, comprising a rectangular body member, a rectangular tapering tail member, both of said members being covered to form a continuous tubular member, laterally extending wings carried by said body member, each of said wings comprising an upper and a lower plane, a steering plane carried by said tail member, means for actuating said steering plane, an ascending and descending plane carried by said body member, means for tilting said latter plane, and a fixed and a movable aileron carried by each of said wings, the movable ailerons forming continuations of the fixed ailerons, and means for tilting said movable ailerons.

2. An aeroplane, comprising a body member, a tapering tail member forming a continuation of the body member, said body and tail member having their upper, lower and side faces covered to form a continuous tubular member, wings carried by said body member, fixed and movable ailerons carried by said wings, said movable ailerons being hingedly secured by their inner ends upon the outer ends of the fixed ailerons, means for tilting said movable ailerons, an ascending and descending plane carried by said body member, means for tilting said plane, a steering plane carried by said tail member, and means for swinging said steering plane, said means consisting of a steering post carried by the body member, a steering wheel rotatably mounted on said post and having a downwardly extending sleeve forming a pulley, and wires connecting said pulley and steering plane.

3. An aeroplane, comprising a body member, a tail member, wings carried by said body member, a steering plane carried by said tail member, means for actuating said steering plane, fixed and movable ailerons carried by said wings, means for tilting said movable ailerons, an ascending and descending plane swingingly mounted on the body member and means for tilting said latter plane, said means consisting of a hollow steering post, a shaft journaled transversely in said post and extending beyond the same, pedals secured to the extended ends of said shaft, a sprocket wheel keyed to said shaft and within said post, a sprocket chain passing over said sprocket wheel and operatively connected to said ascending plane.

In testimony whereof, I affix my signature, in presence of two witnesses.

LUMAN L. GOODRICH, Jr.

Witnesses:
R. A. HOLLAND,
AUG. M. WAHRMUND.

---

Copies of this patent may be obtained for five cents each, by addressing the "Commissioner of Patents, Washington, D. C."